Aug. 3, 1954

E. T. HUNTER 2,685,118

INFLATABLE CORE

Filed Aug. 9, 1950

2 Sheets-Sheet 1

INVENTOR
ELDRED T. HUNTER

BY *Glocock Downing Seubold*

ATTORNEYS

Aug. 3, 1954
E. T. HUNTER
2,685,118
INFLATABLE CORE
Filed Aug. 9, 1950
2 Sheets-Sheet 2
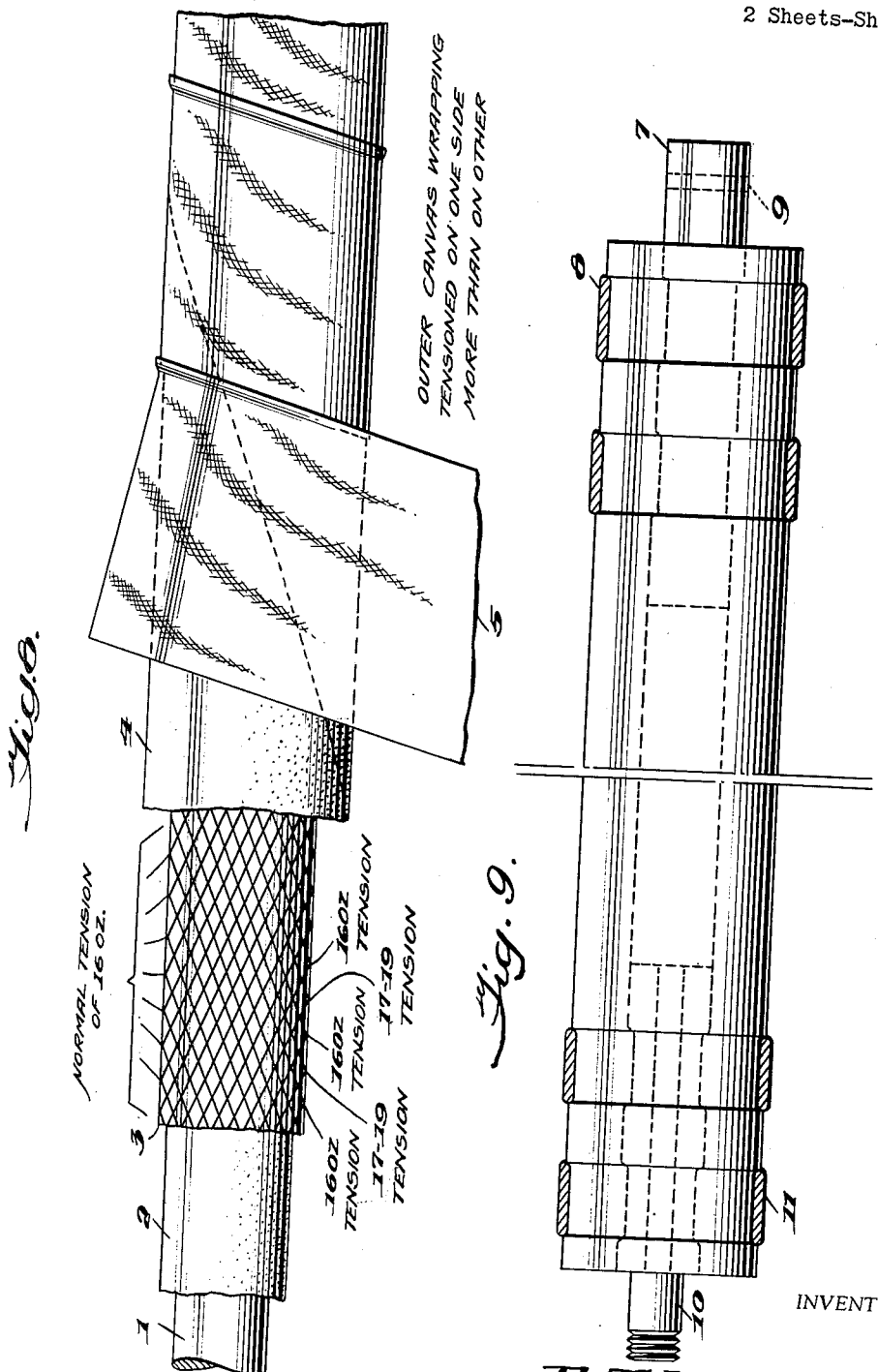
INVENTOR
E. T. Hunter
BY
ATTORNEYS.

Patented Aug. 3, 1954

2,685,118

UNITED STATES PATENT OFFICE 2,685,118

INFLATABLE CORE

Eldred Tait Hunter, Washington, D. C.

Application August 9, 1950, Serial No. 178,536

Claims priority, application Great Britain
August 16, 1949

3 Claims. (Cl. 25—128)

The present invention relates to an inflatable core.

More particularly, the invention relates to what is known as an inflatable core of the type placed within concrete, mastic or a settable plastic mass before it is set and which upon inflation provides a bore or tube within the mass within which it is placed and which core is retained within the mass in an inflated condition until the mass has hardened and set, following which the core is deflated and removed thereby leaving a substantially smooth surface bore in a hardened set mass of concrete or the like, as previously set forth.

It is a primary object of the present invention to provide an inflatable rubber core having such characteristics that it is limited as to the amount of inflation and one that will inflate evenly throughout substantially its entire length.

It is an additional object to provide such a core that on deflation will not adhere to the concrete or such other mass within which it is embedded and can therefore be readily removed from the set mass.

It is a further object to provide an inflatable core that is economical from a standpoint of productive costs and in which the core has such characteristics that the size of the finished opening formed in the set mass can be controlled and preselected.

It is an additional object to provide an inflatable rubber core made in long lengths and relative small diameters, these diameters generally not exceeding four inches after inflation.

While inflatable cores per se are known, the prior art devices cannot be produced in long lengths and small diameters.

Figure 1:
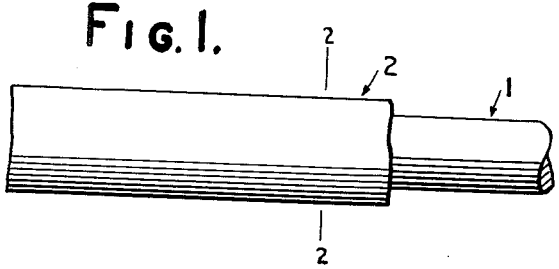
Figure 2:
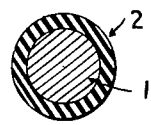
Figure 3:
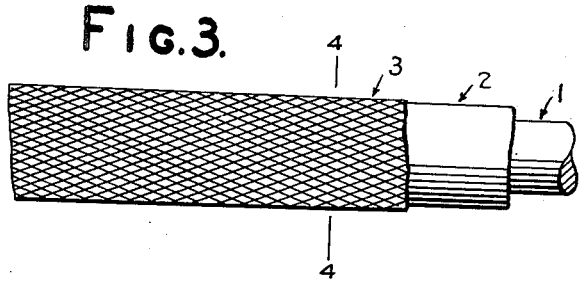
Figure 4:
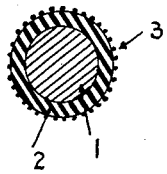
Figure 5:
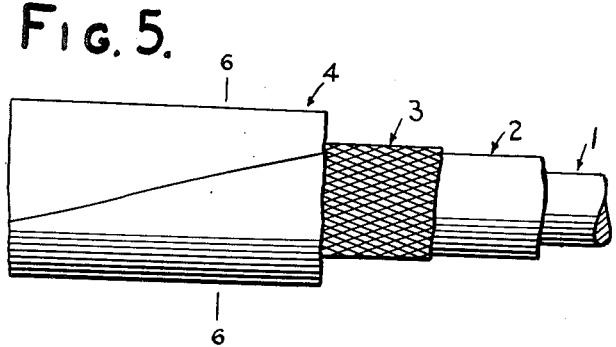
Figure 6:
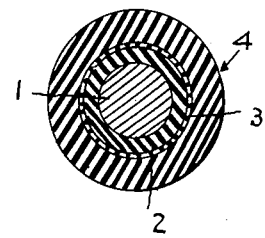
Figure 7:

The accompanying drawing shows several examples embodying the features of the present invention wherein:

Figure 1 is a longitudinal view of the mandrel used in making the rubber core with the original layer of rubber applied thereto, Figure 2 is a cross section of Figure 1 taken on line 2—2 of Figure 1, Figure 3 is a longitudinal view of the mandrel with the inner rubber shown in Figure 1 and the core braid applied thereto, Figure 4 is a cross sectional view taken on line 4—4 of Figure 3, Figure 5 is a longitudinal view of the mandrel, the original rubber, the braid and the outer rubber coating applied thereto, Figure 6 is a sectional view taken on the line 6—6 of Figure 5, Figure 7 is a longitudinal view of the finished core showing the angle of application of the outer layer of rubber, Figure 8 is a diagrammatic view partly broken away to disclose the various layers of the core as made and legend to indicate the tensioning of the braided cord sheath and the canvas wrapper applied to tension the outer rubber layer during the making of the core, and Figure 9 illustrates a core provided with a plug at one end and an inflatable plug at the other.

With particular reference to Figure 1, a mandrel 1 of the length of the finished core is coated with a rubber layer 2 having the desired thickness. The mandrel is conventional and is approximately fifty feet long in order to fit within the known cooking ovens utilized in curing conventional rubber hoses. The thickness of the layer 2 will vary in accordance with the diameter of core to be produced and the air pressure that must be withstood in inflating the same. Preferably I utilize practically pure gum rubber in order to obviate any tendency of the rubber "to set" which setting would prevent the rubber of a finished core from returning to its original outside diameter after inflation to a greater diameter. Over this layer 2 which in effect constitutes a gum rubber tube while the same is still in an uncured or tacky state is braided an expansible and contractable cord sheath 3 illustrated in Figures 3 to 6 and 8. The cords of this sheath are made up of a number of cotton strands having minimum stretch characteristics, a low moisture content and which strands are twisted together. The number and size of the strands in the cords of the braided sheaths vary in accordance with the outside diameter of the finished non-inflated core. For larger core sizes the number of strands and their size are increased. The strands of the cord sheath, which are illustrated diagrammatically in the drawings, are closely laid on to the rubber layer so as to substantially cover the same. The resulting interstices between the strands are very small so that when the core is inflated as hereinafter described and the strands of the sheaths are displaced from their original position relative to the axis of the core the rubber layer 2 is still substantially covered by the sheath. After the cord sheath has been applied a layer of rubber cement of sufficient thickness to wet the sheath and to fill the interstices between the cords is applied and then there is applied an outer rubber sheath 4, as shown in Figures 5 and 6. This outer rubber sheath is of greater thickness than the initial rubber layer 2 and the rubber utilized in this layer has the same characteristic as to purity as the first-mentioned layer. Preferably the outer rubber sheath is applied as a continuous strip spiral wound, as shown in Figure 7. The strip is applied in an uncured or tacky state. The outer rubber sheath can be applied as an envelope, that is, a strip having such width that it can envelope the mandrel, the layer 2 and the sheath and have the end edges abut to provide what amounts to a longitudinal seam running throughout the length of the core. After the outer sheath of rubber is applied a canvas wrapping 5 or wrappings is applied over the previously mentioned layers. This canvas wrapping can constitute one or more layers in the form of an envelope and an outer layer that is spirally wound thereabout under tension. By applying this outer canvas layer in a spiral wound manner or when only a spiral wound layer of canvas wrapping is utilized the application of tension in the winding of the wrapping at an angle to the axis of the core imparts a twist characteristic to the rubber layer and which twist characteristic remains when the rubber is cured. After the canvas wrapping has been applied as indicated in Figure 8, the core length is substantially immediately placed in a suitable oven and heat treated to cure or set the rubber layers. This is a conventional curing operation except as to the time element between wrapping and curing and one generally utilizing steam. After the core has been cured the canvas wrapping is removed and the mandrel is removed, preferably with the aid of air pressure.

The foregoing steps have produced a fifty foot length of tubing having characteristics described hereinafter. This tubing can produce a core of fifty foot lengths or the tubing can be cut to provide cores of shorter lengths or connected together to provide cores of longer lengths. To complete the manufacture of a core a suitable solid plug or closure 7 is inserted in one end of the desired length of tubing and metal rings or clamps 8 are tightly applied to the outside of the outer sheath to secure this solid plug in position. The joint must be sufficiently tight to retain the plug in place under the action of air pressure up to 150 pounds per square inch. The other end of the core length receives in a similar manner a tubular plug 10 provided externally with a conventional Schrader tire valve. As shown in Figure 9 rings or clamps 11 are tightly applied to the outer sheath 4 to secure the tubular plug 10 in position. We therefore have an inflatable core of the desired length and it is further noted that the solid plug 7 protrudes from the end of the core a length sufficient to receive a transverse bore 9 and which bore is utilized to receive a fish line or leader so that as the core is removed an electrical wire or other conduit can be connected to the plug and drawn into the tube or duct produced utilizing the inflatable core.

The braid is applied directly on the inner rubber layer 2 while the same is still wet or tacky and in order to enable an even expansion of the finished core upon inflation it is desirable that the angle between each strand of braid and a line on the surface of and parallel to the axis of the core when inflated should preferably be between 42° and 53°. In order to obtain such an angle of the braid it has been found desirable to apply the braid onto the inner rubber 2 so that it makes an angle of between 13° and 19° with the axis of the unexpanded core in the case of mandrel diameters between ¼" and 9/16" and from 17½° to 25½° for larger mandrel diameters of the order of 1¼".

The inner rubber and braid will tend to free itself from the surrounding rubber of the outer sheath 4 and hence during inflation of the finished core the braid will limit the expansion and provide an even expansion over the length of the core, the braid changing its angle from that at which it was braided e. g. about 13°—19° to an angle of 42° to 53° when the core is expanded.

When the fluid in the core is brought under pressure, less than 150 lbs. per square inch, usually in the neighborhood of 40 to 70 lbs. per square inch, the core will shorten in length and increase in diameter. This is then surrounded by wet concrete and on deflation after the concrete has hardened the core will increase in length and decrease in diameter and will come free of the concrete allowing the core to be removed to leave the desired duct. The change in angle of the braid during deflation of the core will cause the latter to contract and lengthen during deflation thus assisting in freeing it from the surrounding concrete.

The outer coating is applied over the treated cord in a continuous strip wound spirally thereon. This is held in place during the first heat treatment and the subsequent steam curing by means of canvas wrapping applied to the surface thereof, so as to obtain a uniform product of the desired outside diameter.

The core made by the above process will have an inner wall thickness varying from ⅛ inch to ¼ inch depending on the outside diameter of the finished core. The above thicknesses are given for a finished core of 1⅙ inch to 2 inches, which may be inflated to 1 inch to 4 inches.

One size is made on a mandrel 9/16 of an inch in diameter upon which is applied the inner rubber layer ⅛ of an inch thick. On this is braided the cord treated with rubber cement and then an external layer of rubber is applied thereon which is approximately ¼ of an inch thick. The outside diameter of the finished core is 1⅜ inch and may be expanded to approximately 2 inches, using an internal fluid pressure of 40 to 70 lbs. This will vary depending upon the age of the product, the heavier pressure being necessary with newly made cores. The core is loosened within its surrounding rubber to give a free working restricting sheath surrounding the inner rubber tubing.

This process of using a long mandrel up to 50 feet on which is coated a pure rubber layer and then braiding directly on to the uncured rubber a cord sheath, treating the cord sheath with a rubber cement and applying to this the outer layer of rubber in a tacky condition has led to the production of a satisfactory product where many others have failed. Cores of this type may be made with any outside diameter, which in inflation will range from 1 inch to four inches.

These cores are strong, will stand the rough treatment to which they are subjected, are air tight, may be readily inflated by either a hand pump or compressed air tank and upon deflation will not cling to the cement walls of the conduit formed, and will increase in length so as to be readily removed from the finished conduit.

In connection with the finished core the spiral winding of the canvas wrapping 5 is such that tension is applied to the wrapping as it is being wound on the outer layer 4 and this tension as indicated previously imparts a twist characteristic to the rubber even though it is unset and upon subsequent curing this twist is retained in the rubber. This twist characteristic is important since when the core is inflated it will expand in outside diameter and contract in length. Therefore when the core is deflated the rubber in contracting in diameter and length will twist to restore itself to its original condition and this twist action in deflating will definitely improve the ease of removal of the core from the surrounding concrete or other plastic mass. In other words, every particle of rubber of the outer sheath has moved when the core is deflated and in effect physically tears itself away from any adherence to the inner surface of the duct or tube made in the concrete or like material.

The canvas wrapping is approximately 3" wide and the twist is imparted to the rubber by applying greater tension to one marginal edge of the wrapping as it is being applied. In other words, as the spiral wrapping is laid on the outer rubber sheath one side is pressed toward the rubber under greater tension than the other side of the strip, see Figure 8. Thus in a finished tube or core slight spiral ridges are formed in the outer surface of the outer sheath and alternate edges of the ridges are more pronounced.

In connection with the braiding of the fabric core or sheath on to the inner rubber layer by applying slightly greater tension to some of the cords being braided from one side of the axis of the tube and by braiding uniformly a twisting movement is produced over the whole length of the tube which enhances the twist characteristic applied to the finished core as shown in Figure 8.

It is to be noted that the spiral wrapping 5 is applied at an angle in the same direction as the braid tension. Thus it follows that the braiding imparts a twist to the inner rubber layer which constitutes an expansible and contractable tube which twist is assisted by the twist imparted to the outer rubber layer, also an expansible and contractable tube by the tensioning of the canvas wrapping 5.

Thus it follows that when using my inflatable cores and they are inflated to the size required utilizing 50 to 70 lbs. pressure and substantially oil free air, the diameter of the tube increases uniformly as it is inflated and the braided sheath contracts lengthwise so that the length of the tube decreases uniformly by about 15 per cent and since, as previously mentioned, one or more cords of one set of the diagonal cords of the fabric sheath is braided with a slightly greater tension, there is produced a twisting movement over the whole length of the tube. The tension applied to the cords is of the order of a few ounces, preferably one to three ounces, greater than the tension in the other cords. This action therefore imparts three distinct movements which breaks any key or seal between concrete and the tube in use when the tube is deflated. First, the decrease in diameter; second, the increase in length, and finally, the twist of the core.

As previously indicated longer runs of inflatable core can be produced by joining two lengths together. Such a joint embodies a placing of the plug ends in abutting relation and a sleeve or length of tubing of the required duct internal diameter is deposited about the abutting ends. Of course, in such an arrangement it is necessary to inflate each length separately but the increased length of tubing is still highly desirable in some installations.

With this type joint upon inflation of the two cores the expansion of the diameter thereof adjacent the plugged end produces a friction fit between the two adjacent core ends and the sleeve surrounding the same to the extent that this joint can only be broken by deflating the respective cores.

If larger ducts are required in concrete they can be obtained from a single core the increased diameter can be obtained by tying tubes or cores together and using them as a unit. For example, a duct approximately 9" by 6" in size can be obtained by using six 3" expanded o. d. cores tied together as a unit. By tying together I mean placing several cores side by side and by, for example, the use of rubber bands holding them in assembled relationship. Alternatively several cores can be inflated, placed in parallelism and tied together by wire, then placed in position and covered with concrete or the like. Upon deflation the individual cores reduce in diameter and can be individually withdrawn and the wire stay embodied in the concrete.

It is further noted that while the mandrel length is stated to be approximately 50 feet long, there is of course no limitation to the length of the mandrel other than the length of the cooking oven utilized to cure the rubber; for example, in European practice the ovens are approximately 60 feet long thus necessitating the use of a 60 foot mandrel in carrying out the process. If larger ovens are available, the mandrel can be lengthened accordingly.

What I claim is:

1. An inflatable conduit core comprising a composite tube including an inner rubber layer, a braided cord sheath applied thereto with the cords of the sheath being diagonal and at an angle of between 13° and 25½° with respect to the axis of the tube and some of the diagonal cords of the braided sheath on one side of the longitudinal axis of the tube being under greater tension than the other cords, and an outer rubber sheath tensioned in the same direction as said cord sheath, a plug closing one end of the tube, and a valve disposed at the other end of said tube so that the core can be inflated and upon inflation the tube will shorten and the cords of the sheath will contract to assume an angle of between 42° and 53° relative to the axis of the tube whereby the expansion of the tube is restrained to uniform expansion by the tensioning of the cords of the sheath and the rubber of the outer sheath.

2. An inflatable conduit core comprising a composite tube including an inner rubber layer, a braided cord reinforcing sheath applied thereto with the cords thereof being diagonal and some of the diagonal cords on one side of the longitudinal axis of the core being under greater tension than the other cords, and an outer rubber sheath encompassing said braided sheath and tensioned in the same direction as the greater tensioned cords.

3. An inflatable conduit core comprising a composite tube including an inner rubber layer, a braided cord reinforcing sheath applied thereto with the cords thereof being diagonal and some of the diagonal cords on one side of the longitudinal axis of the core being under greater tension than the other cords, an outer rubber sheath encompassing said braided sheath and tensioned in the same direction as the tensioned cords, means closing one end of the composite tube, and valved means closing the other end of the tube and operative to permit inflation of the core.

References Cited in the file of this patent

UNITED STATES PATENTS

| Number | Name | Date |
|---|---|---|
| 1,190,292 | Hopkins | July 11, 1916 |
| 1,214,268 | Blodgett | Jan. 30, 1917 |
| 1,230,867 | Cobb | June 26, 1917 |
| 1,352,740 | Egerton | Sept. 14, 1920 |
| 1,428,201 | Andrews | Sept. 5, 1922 |
| 1,981,201 | Semler | Nov. 20, 1934 |
| 2,035,660 | Lippitt | Mar. 31, 1936 |
| 2,090,014 | Wiltse | Aug. 17, 1937 |
| 2,392,992 | Martin | Jan. 15, 1946 |
| 2,482,702 | Billmeyer | Sept. 20, 1949 |